US008572284B2

(12) United States Patent
Moon

(10) Patent No.: US 8,572,284 B2
(45) Date of Patent: *Oct. 29, 2013

(54) METHOD AND APPARATUS FOR REGISTERING A MOBILE OBJECT ON A FOREIGN NETWORK

(75) Inventor: Billy G. Moon, Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/412,837

(22) Filed: Mar. 6, 2012

(65) Prior Publication Data

US 2012/0166663 A1    Jun. 28, 2012

Related U.S. Application Data

(63) Continuation of application No. 09/864,750, filed on May 24, 2001, now Pat. No. 8,131,870.

(51) Int. Cl.
*G06F 15/173* (2006.01)
*G06F 15/16* (2006.01)

(52) U.S. Cl.
USPC ............ 709/238; 709/201; 709/229; 709/245

(58) Field of Classification Search
USPC .......... 709/201–203, 217–232, 238–240, 245
See application file for complete search history.

(56) References Cited

U.S. PATENT DOCUMENTS

| 5,341,477 | A | 8/1994 | Pitkin et al. |
| 5,881,284 | A | 3/1999 | Kubo |
| 6,052,718 | A | 4/2000 | Gifford |
| 6,058,311 | A | 5/2000 | Tsukagoshi |
| 6,112,243 | A | 8/2000 | Downs et al. |
| 6,256,300 | B1 | 7/2001 | Ahmed et al. |
| 6,430,698 | B1 | 8/2002 | Khalil et al. |
| 6,463,286 | B1 | 10/2002 | Salminen |
| 6,463,454 | B1 | 10/2002 | Lumelsky et al. |
| 6,496,871 | B1 | 12/2002 | Koyama et al. |
| 6,665,537 | B1 | 12/2003 | Lioy |
| 6,721,291 | B1 | 4/2004 | Bergenwall et al. |
| 6,738,362 | B1 | 5/2004 | Xu et al. |
| 6,757,729 | B1 | 6/2004 | Devarakonda et al. |
| 7,313,631 | B1 * | 12/2007 | Sesmun et al. ........ 709/245 |

OTHER PUBLICATIONS

U.S. Appl. No. 09/864,795, entitled "Method and Apparatus for Providing a General Purpose Computing Platform at a Router on a Network," filed May 24, 2001, 63 total pages.
U.S. Appl. No. 09/864,749, entitled "Method and Apparatus for Providing a Distributed Service in a Network," filed May 24, 2001, 58 total pages.

* cited by examiner

*Primary Examiner* — Yasin Barqadle
(74) *Attorney, Agent, or Firm* — Baker Botts L.L.P.

(57) ABSTRACT

A method and apparatus for registering a mobile object on a foreign network are disclosed. A first virtual machine at a first router on a foreign network executes a mobile object and generates a care-of-name for the mobile object. The foreign object agent communicates the care-of-name to a home object agent located on a home network. The home object agent creates a mobility binding for the mobile object by using the care-of-name.

39 Claims, 6 Drawing Sheets

FIG. 3
| SERVICES | INTERFACES |
|---|---|
| DHCP SERVER | ETHERNET |
| HTTP SERVER | WIC/VIC |
| NTP | ATM |
| VIRTUAL SERVICES | OCX |
| ⋮ | VIRTUAL INTERFACE |
|  | ⋮ |
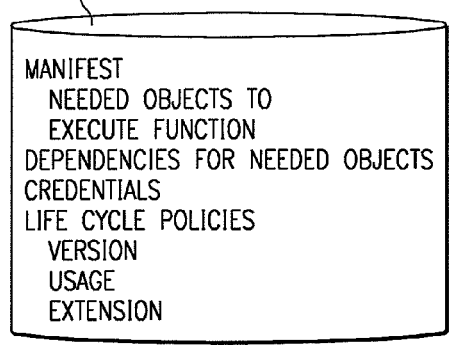
FIG. 4
MANIFEST
  NEEDED OBJECTS TO
    EXECUTE FUNCTION
  DEPENDENCIES FOR NEEDED OBJECTS
  CREDENTIALS
  LIFE CYCLE POLICIES
    VERSION
    USAGE
    EXTENSION
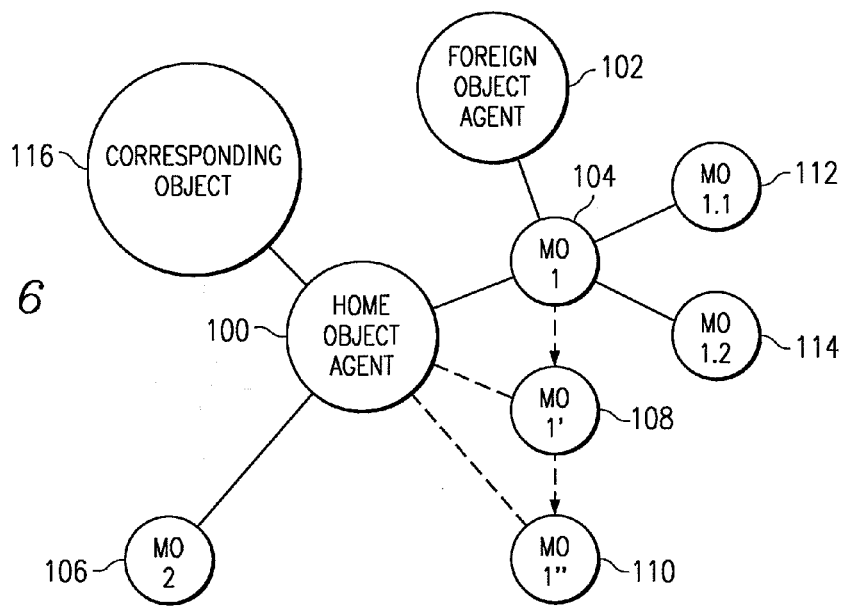
FIG. 6
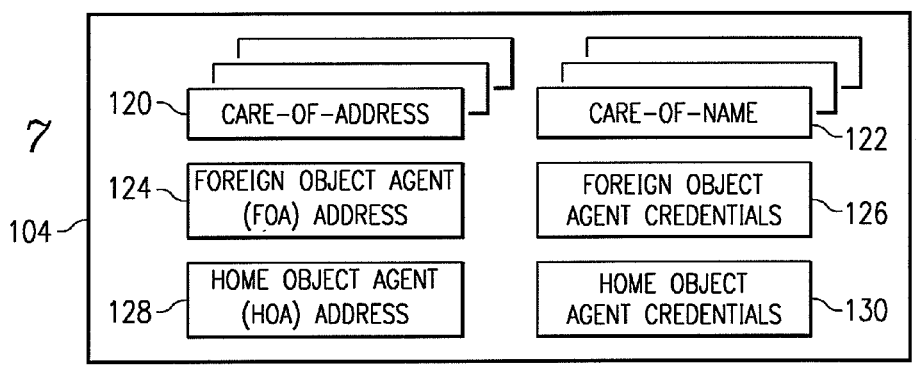
FIG. 7

METHOD AND APPARATUS FOR REGISTERING A MOBILE OBJECT ON A FOREIGN NETWORK

CROSS REFERENCE TO RELATED APPLICATIONS

This application is a continuation of U.S. application Ser. No. 09/864,750, filed May 24, 2001, by Billy G. Moon and entitled "Method and Apparatus for Registering a Mobile Object on a Foreign Network".

TECHNICAL FIELD OF THE INVENTION

This invention relates in general to networks, and more particularly to a method an apparatus for registering a mobile object on a foreign network.

BACKGROUND OF THE INVENTION

A common aspect of many systems and services that are distributed on a global basis is the existence of an orthogonal naming structure for the systems and services within a wide area network. In general, there are two distinct kinds of orthogonal naming structures: fixed and extensible. Fixed names are controlled by an authority that can assure that each name is unique within the space controlled by that authority. In contrast, extensible names are generally not controlled by a central authority. Extensible names typically consist of one or more sub-names that may have at least one part that is a fixed orthogonal name. Each sub-name may have zero or more sub-parts that form an ontology that is only guaranteed to be bounded by the fixed orthogonal name. An example of an extensible name is any name assigned to a service by a Dynamic Name Server (DNS). The DNS assigned name may be used to locate the service within a particular network. However, if the service moves around or outside of the particular network, the DNS assigned name may no longer be unique to the service at its new location.

SUMMARY OF THE INVENTION

In accordance with the present invention, the disadvantages and problems associated with registering a mobile object on a foreign network have been substantially reduced or eliminated. In a particular embodiment, a method for registering a mobile object on a foreign network is disclosed that creates a binding at a home object agent located on a home network for a mobile object by using a care-of-address and a care-of-name assigned to the mobile object by a foreign object agent located on a foreign network.

In accordance with one embodiment of the present invention, a method for registering a mobile object with a foreign network includes executing a mobile object on a first virtual machine at a first router on a foreign network. A foreign object agent located on the foreign network generates a care-of-name for the mobile object and sends the care-of-name to a home object agent located on a home network. The home object agent generates a mobility binding for the mobile object by using the care-of-name.

In accordance with another embodiment of the present invention, a method for registering a mobile object with a foreign network includes executing a mobile object on a virtual machine at a router on a foreign network. A foreign object agent located on the foreign network generates a care-of-name for the mobile object and sends the care-of-name to a home object agent located on a home network. The home object agent generates a mobility binding for the mobile object that includes the care-of-name and locates the mobile object on the foreign network by using the care-of-name.

In accordance with a further embodiment of the present invention, a router includes a virtual machine configured to host a mobile object. The virtual machine negotiates with a foreign object agent located on a foreign network for a care-of-name associated with the mobile object and obtains a binding for the mobile object from a home object agent located on a home network by using the care-of-name.

Important technical advantages of certain embodiments of the present invention include an object naming structure that allows users of a mobile object to discover the mobile object at any location on a network and to establish a binding with the mobile object at the discovered location. When the mobile object moves away from its home network and registers with a foreign network, a home object agent on the home network receives a name and address for the mobile object on the foreign network. The home object agent creates a binding for the mobile object on the foreign network. A corresponding object can locate and communicate with the mobile object on the foreign network through the home object agent.

Another important technical advantage of certain embodiments of the present invention includes an object naming structure that maintains ontologically correct names for a distributed mobile object. Under certain network conditions, a mobile object may be divided into multiple parts and hosted by virtual machines on routers located on the mobile object's home network and other foreign networks. Each part of the mobile object may be assigned an extensible name that uniquely identifies that part of the mobile object. A home object agent located on the home network maintains a list of the extensible names associated with each part of the mobile object.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 3 illustrates a table of services and interfaces available on the router;

FIG. 4 illustrates a data structure for logic located at a remote site on the network;

FIG. 6 illustrates a block diagram of mobility bindings created when a mobile object migrates from a home network to a foreign network in accordance with the teachings of the present invention;

FIG. 7 illustrates a data structure for the mobile object;

DETAILED DESCRIPTION OF THE INVENTION

Figure 1:
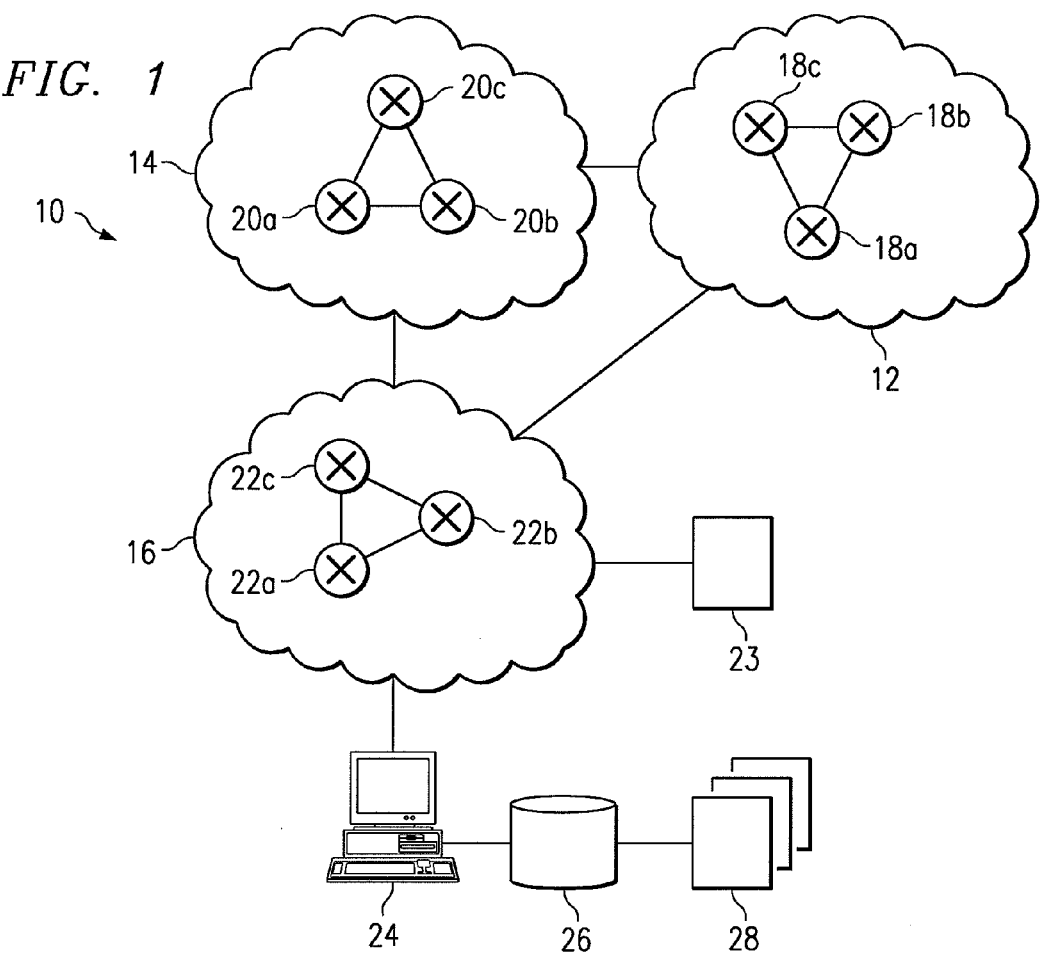
FIG. 1 illustrates a block diagram of a communications network including routers that support a general purpose computing platform in accordance with the teachings of the present invention.

FIG. 1 illustrates a block diagram of a communication system, indicated generally at 10, including routers 18, 20 and 22 (generally referred to as routers 18) respectively located on networks 12, 14 and 16 (generally referred to as networks 12) that support a general purpose computing platform. In the illustrated embodiment, remote site 24 couples to network 16, and database 26, which includes logic 28, couples to remote site 24. In alternative embodiments, remote site 24 may couple to and communicate with any of networks 12. Although specific embodiments are described in which selected routers 18 provide specific services, routers 18 generally may provide any and all services.

Networks 12 represent any suitable collection and arrangement of communications equipment supporting the transport and delivery of packets, cells, or other portions of information (generally referred to as packets). For example, networks 12 may be one or a collection of components associated with the public switched telephone network (PSTN), a local area network (LAN), a wide area network (WAN), a global computer network such as the Internet, or any other communications equipment suitable for providing wireless and/or wireline communications. Through the operation of routers 18, networks 12 route various packets of information associated with communication sessions along different physical paths.

In the illustrated embodiment, networks 12 include routers 18, which are linked by any suitable physical transmission media and/or communications equipment. Routers 18 may represent communications equipment, including hardware and/or software, operable to receive, route and transmit packets of information. Routers may include one or more interfaces through which the services provided by routers 18 may be accessed by other devices on networks 12. In one embodiment, routers 18 further include an operating system that provides a specific set of networking services and capabilities. The operating system on routers 18 may be monolithic and may support various platforms and processors, including, but not limited to, POWER_PC, 68K, MIPS, ARM, Super H, PENTIUM and ATHLON.

Remote site 24 may be a device at a service provider location suitable to provide information for transmission over networks 12. Database 26 may be any suitable storage medium that is accessible by remote site 24. In the illustrated embodiment, database 26 includes logic 28. Logic 28 may include a collection of mobile objects and their associated dependencies, credentials and lifecycle policies, or any other form of software that may be executed on a virtual machine hosted by routers 18. An individual mobile object may be defined by data that represents specific attributes or properties of the mobile object, and a set of functions or methods that can be performed on or by the mobile object. Typically, each mobile object may receive messages instructing it to perform a particular function, or send such messages to other objects. In practice, mobile objects are frequently reusable and may be called by a variety of different application programs or services. Mobile objects may be written in Java, Small Talk, Pascal, CORBA, COM, DCOM, Delphi, Basic, XML, or any other suitable platform dependent or independent programming language.

In operation, routers 18 receive a provisioning message from logic 28 to configure a virtual machine that executes a desired service. The provisioning message contains a set of configuration parameters, which include an amount of allocated processing resources, a lifecycle policy and authorized credentials for the virtual machine. Routers 18 receive logic 28 from remote site 24, which includes a manifest of mobile objects required to execute the desired service on the virtual machine. Routers 18 verify that the virtual machine may execute the desire service from logic 28 based on the configuration parameters. If the virtual machine may execute the desired service, routers 18 retrieve the lifecycle policy associated with the desired service from logic 28 and update the versions of the mobile objects if the manifest does not contain the correct versions.

If the virtual machine at a selected one of routers 18 becomes unavailable to host the desired service from logic 28, one or more of the mobile objects contained in the manifest migrate from the virtual machine on a home network (e.g., network 16) to a virtual machine located at another one of routers 18 on a foreign network (e.g., network 14). The mobile objects from logic 28 negotiate with a foreign object agent on the foreign network for a care-of-address and a care-of-name that identify the mobile objects on the foreign network. The foreign object agent communicates the care-of-address and the care-of-name for the mobile objects to a home object agent on the home network. The home object agent creates a mobility binding for the mobile objects based on the care-of-address and the care-of-name and communicates packets to the mobile objects when they are located on the foreign network.

A corresponding object may request to use a desired service provided by logic 28. The corresponding object has no knowledge that the mobile objects associated with the desired service may migrate from their home network and, therefore, sends a request to use the desired service to the home network for the mobile objects. A home object agent located on the home network detects the request and determines that the request should be sent to the mobile objects associated with the desired service. The home object agent creates a tunnel between the home address and the care-of-address for the mobile objects and sends the request directly to the mobile objects via the tunnel. If the corresponding object is authorized to use the desired service, the mobile objects communicate the desired service to the corresponding object using standard routing protocols.

The mobile objects from logic 28 also monitor the number of requests to use the desired service. Each request to use the service includes lease constraints, such as a percentage of the desired service requested by the corresponding object and an amount of processing resources required to execute the percentage of the desired service. If the mobile objects from logic 28 determine that the virtual machine cannot execute the desired service based on the lease constraints, the mobile objects distribute all or a part of the desired service to other routers 18 on networks 12 by establishing a virtual machine at an available router 18 within networks 12. The mobile objects also monitor the traffic flow on networks 12 and further distribute the desired service to optimize the path of the service through networks 12.

Figure 2:
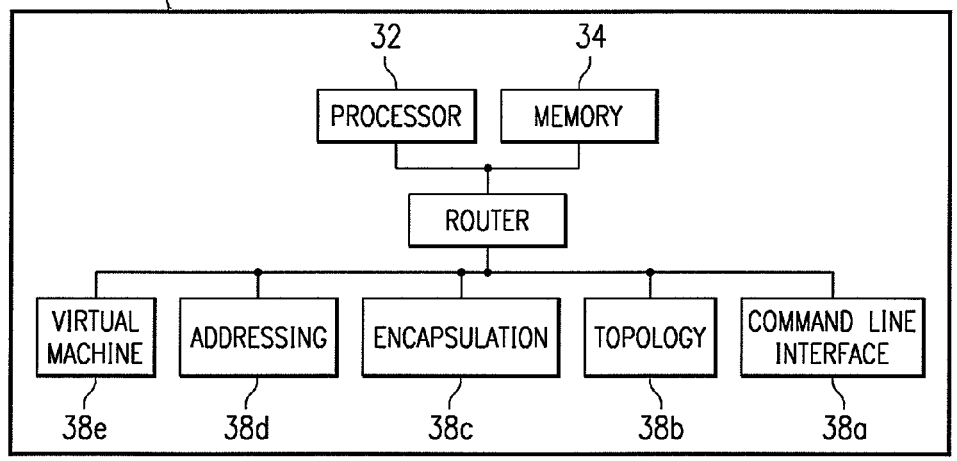
FIG. 2 illustrates a block diagram of a logical model of a router that provides a general purpose computing platform on the network.

FIG. 2 illustrates a block diagram of a logical model of routers 18 that provide a general purpose computing platform on networks 12. In the illustrated embodiment, routers 18 include processor 32, memory 34, and services 38. Processor 32 may be a microprocessor, a microcontroller, a digital signal processor (DSP) or any other digital circuitry configured to execute an operating system and any services provided by routers 18. Memory 34 may be random access memory (RAM), electrically erasable programmable read-only memory (EEPROM), a PCMCIA card, flash memory, or any suitable selection and/or array of volatile or non-volatile memory that retains data after the power to routers 18 is turned off.

Services 38 provided by routers 18 may include command line interface (CLI) 38a, topology 38b, encapsulation 38c, addressing 38d, virtual machine 38e or any other suitable service that may be configured on and provided by routers 18. CLI 38a is the primary user interface for routers 18. CLI 38a provides network management and provisioning commands that allow an authorized user, such as a network administrator, to configure routers 18, display information such as routing tables, display routing protocol-specific information, and check network connectivity. Topology 38b builds a network topology based on addresses associated with individual interfaces on routers 18. Encapsulation 38c allows routers 18 to alter the routing for packets transmitted over networks 12 by delivering the packets to an intermediate destination that could otherwise not be selected based on the destination address. Addressing 38d includes the ability to provide addresses for hosts on networks 12. Routers 18 may also provide routing services through the implementation of various routing protocols including, but not limited to, RIP, TRIP, DRP, IGRP, EIGRP, SMRP, ES-IS, IS-IS, GGP, EGP, OSPF, and BGP, quality of service (QoS) services through protocols including, but not limited to, RSVP, MPLS, CAR, DCAR, GTS, FRTS, LFI, RTP, CRTP, MLP, PQ, RSVP+, WFQ, EWFQ, WRED, DWRED, and COS, discovery services such as ARP, RARP, ICMP, BOOTP, DHCP and CDP, and group services such as IGMP, MBONE, MOSPF, PIM, and DVMRP.

Virtual machine 38e may be software or other code that provides remote access to functionality implemented or enabled by the operating system on routers 18. In operation, virtual machine 38e allows a desired service from logic 28 at remote site 24 to be dynamically added to routers 18. For example, remote site 24 may request access to router 22a on network 16 in order to add a desired service provided by a mobile object from logic 28. The request for access includes a message to configure virtual machine 38e on router 22a. If remote site 24 is authorized to access router 22a, router 22a configures virtual machine 38e with a set of configuration parameters.

In operation, virtual machine 38e hosts the mobile object from logic 28 and acts as an interface between the mobile object and processor 32, which executes the operating system on router 22a. Virtual machine 38e also distinguishes between packets that contain data to be routed across networks 12 and packets that contain information associated with a desired service from logic 28. Virtual machine 38e receives the packets in a message format that may be broken up and applied by virtual machine 38e.

FIG. 3 illustrates a table of services and interfaces that are available on routers 18 on networks 12. In operation, virtual machine 38e may be configured as either a virtual interface or a virtual service by using CLI 38a. A virtual interface may be configured on one interface at routers 18, while a virtual service may be configured on some or all interfaces at routers 18. An address is assigned to each interface at routers 18. When virtual machine 38e is configured as a virtual interface, a desired service provided by a mobile object from logic 28 may be associated with and accessible from the one or more addresses assigned to the specific interface on routers 18. In contrast, if virtual machine 38e is configured as a virtual service, the desired service may be associated with and accessible from all addresses assigned to any number of the interfaces on routers 18. Therefore, a virtual service provides access to the desired service on virtual machine 38e even if one interface becomes inaccessible. Routers 18 may further be configured with any combination of virtual interfaces and/or virtual services.

As shown in FIG. 3, services provided by routers 18 may include, but are not limited to, Dynamic Host Control Protocol (DHCP), Hypertext Transfer Protocol (HTTP), Network Time Protocol (NTP), virtual services executed by virtual machine 38e and any other suitable service or protocol that may be implemented by routers 18 to communicate information on networks 12. Interfaces provided by routers 18 may include, but are not limited to, physical interfaces such as Ethernet, Wide Area Interface Cards (WIC), Voice Interface Cards (VIC), Asynchronous Transfer Mode (ATM), and virtual interfaces executed by virtual machine 38e that run on top of the physical interfaces. In one embodiment, the virtual interfaces may include NULL, loopback, virtual templates, ASYNC, multilink and tunnels.

In one embodiment, routers 18 may include multiple virtual machines 38e. Each virtual machine 38e may be configured as a virtual interface or a virtual service. If the multiple virtual machines 38e are configured as virtual interfaces, each virtual machine 38e may have a unique address. If the multiple virtual machines 38e are configured as a combination of virtual interfaces and virtual services, the virtual interfaces may be accessible from the unique address while the virtual services may be accessible from all addresses associated with routers 18.

In another embodiment, virtual machine 38e may run concurrently and transparently on one or more of routers 18, thus allowing parts of a function or service to execute on different areas of one network and/or multiple networks. In an alternative embodiment, multiple services may be executing on sub-virtual machines within virtual machine 38e. Each of the sub-virtual machines may be associated with a sub-interface that is accessible through an interface and/or interfaces associated with virtual machine 38e.

FIG. 4 illustrates a data structure for a desired service from logic 28 at remote site 24. As described above, logic 28 includes a collection of desired services and their associated mobile objects that may be added to networks, 12 at routers 18. For each desired service, logic 28 may include a manifest, credentials, and a lifecycle policy. Each time a desired service is added to networks 12, virtual machine 38e at routers 18 receives an address for logic 28 at remote site 24 and loads the data structure associated with the desired service into memory 34. Each part of the data structure may be used to configure and initiate the desired service on virtual machine 38e.

The manifest for each desired service may include a list of the mobile objects required by virtual machine 38e to execute the desired service and a list of processing resource dependencies for the required mobile objects. During initialization of virtual machine 38e, the list of required mobile objects is loaded into memory 34 and the list of dependencies is read by virtual machine 38e to determine the amount of processing resources required to execute the desired service at routers 18. If sufficient processing resources were allocated during configuration of virtual machine 38e, routers 18 obtain the required mobile objects listed in the manifest from logic 28 at remote site 24 and use the required mobile objects to execute the desired service. If the required mobile objects cannot be executed on routers 18 due to insufficient processing resources, routers 18 attempt to further distribute the desired service by moving all or parts of the service to other routers 18 located on networks 12. If routers 18 cannot find suitable resources to execute the desired service as defined by the manifest, routers 18 post an error message that may be logged for operator intervention through CLI 38*a*.

The credentials for each desired service provide a key to access processing resources (e.g., processor 32 and memory 34) on routers 18. During configuration of virtual machine 38*e*, credentials for service providers that may add functionality to routers 18 are loaded into memory 34. During initialization of the desired service, the service credentials are compared with the authorized credentials loaded into routers 18 during configuration of virtual machine 38*e*. If the service credentials match one of the authorized credentials, the desired service may be added to routers 18 on virtual machine 38*e*.

Virtual machine 38*e* retrieves a lifecycle policy for the desired service from logic 28 at remote site 24. The lifecycle policy for each desired service may include usage criteria, object version information and extension authorization. The usage criteria specifies how the desired service may be used. For example, usage of the desired service may be transaction based, such that the desired service may be used one time, a given number of times, or so long as the desired service resides on routers 18. In an alternative embodiment, usage of the desired service may be time based and the desired service may be used for minutes, days, years, or any other suitable measure of time.

The object version information specifies how often virtual machine 38*e* should check logic 28 at remote location 24 for updated versions of the required mobile objects associated with the desired service. When virtual machine 38*e* locates a new version of one or more of the required mobile objects, virtual machine 38*e* loads the new version into memory 34.

The extension authorization specifies if the desired service may be used or revised by other services residing on networks 12. For example, a service executing on virtual machine 38*e* at router 22*a* on network 16 may depend on another service executing virtual machine 38*e* at router 18*a* on network 12. If the service at router 18*a* is not extensible, the service at router 22*a* may not perform its function by using the service at router 18*a*.

Figure 5:
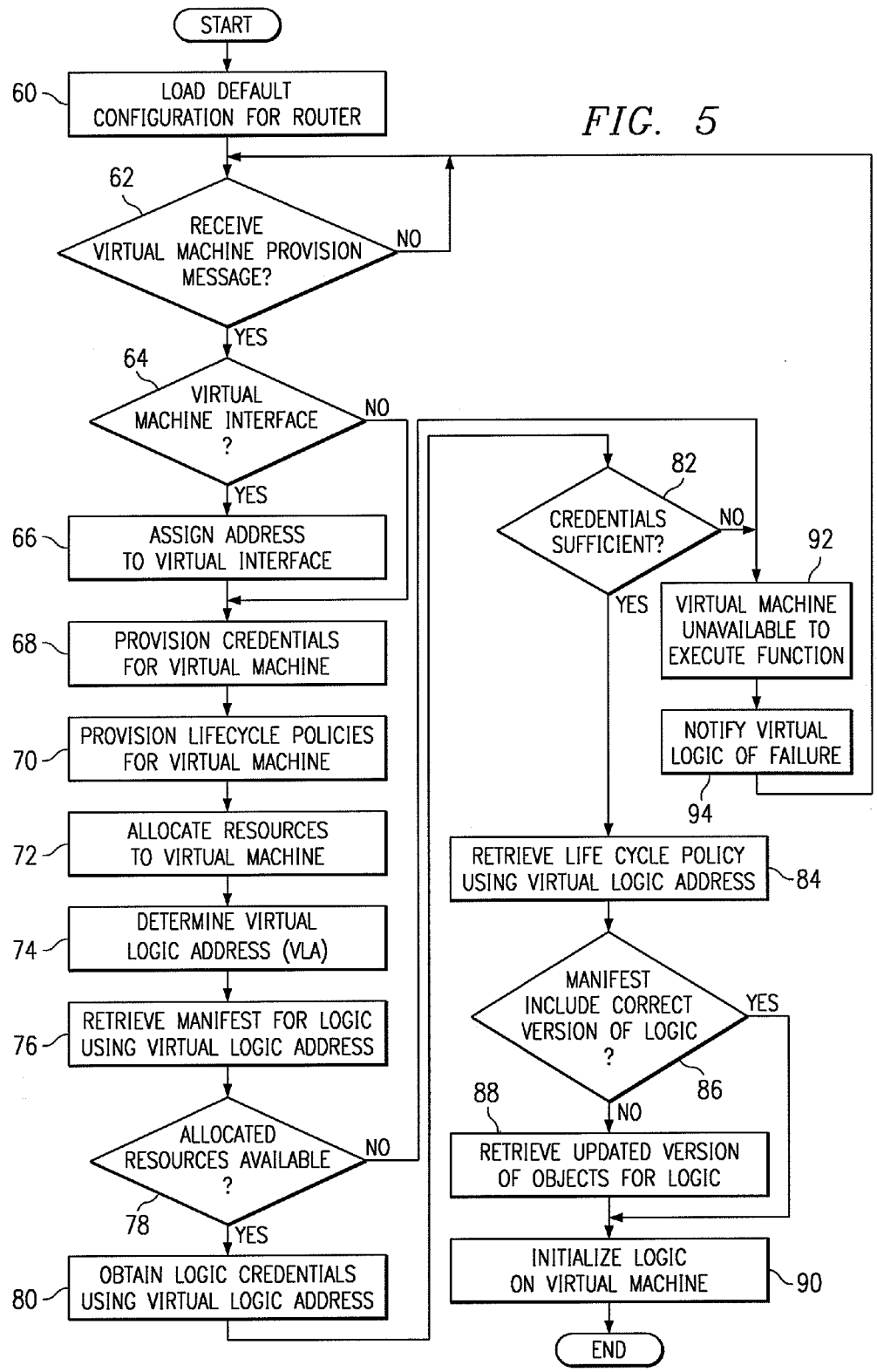
FIG. 5 illustrates a flowchart of a method for providing the general purpose computing platform at the router on the network.

FIG. 5 is a flow chart for providing a general purpose computing platform on router 18 within networks 12. Generally, upon loading a virtual machine configuration record or by receiving a command by the router operator through CLI 38*a*, router 18 configures virtual machine 38*e* by creating a set of default parameters that may include a list of authorized credentials, a baseline lifecycle policy and an amount of processing resources allocated to execute one or more desired service. Alternatively, router 18 may include a virtual service machine (e.g., a home object agent or a foreign object agent) that allows a provisioning message to be sent to router 18 in order to invoke a virtual service.

Once virtual machine 38*e* is configured with the default parameters, virtual machine 38*e* determines an address for remote site 24 and retrieves a manifest associated with the desired service from logic 28 by using the remote site address. If the processing resources allocated during configuration are sufficient to execute the desired service, virtual machine 38*e* obtains credentials for the desired service from logic 28 at remote site 24 using the remote site address. If the logic credentials match the authorized credentials created during configuration, virtual machine 38*e* obtains the lifecycle policy for the desired service from logic 28 at remote site 24.

Virtual machine 38*e* then updates versions of the mobile objects required to execute the desired service if the manifest does not contain the correct version and initializes the desired service on router 18 by using the correct versions of the required mobile objects.

As shown at step 60, default configuration parameters for router 18 is loaded into memory 34. The default parameters may include baseline credentials for third parties authorized to add functionality to router 18, a baseline lifecycle policy for any virtual machine 38*e* established on router 18, and an operating system that includes basic functions and services needed to route packets of information through networks 12. If router 18 receives a virtual machine provisioning message for a desired service at step 62, router 18 determines if the message contains a request to configure a virtual interface or a virtual service at step 64. In one embodiment, the message may be a simple network management protocol (SNMP) request. If the message contains a request to configure a virtual interface, an address is assigned to an available interface on router 18 at step 66. The address may be an IP address, Ethernet address, DECNET address, APPLE TALK address, or any other suitable address that identifies the location of the virtual interface on networks 12.

If the message contains a request to configure a virtual service or a virtual interface, router 18 configures virtual machine 38*e* by using a set configuration parameters provided by the provisioning message. At step 68, router 18 obtains a of set of authorized credentials from the provisioning message. The authorized credentials may be the same as the baseline credentials created during the configuration of router 18 or may further restrict access to processor 32 on router 18 to a smaller group of third party providers.

At step 70, router 18 continues to configure virtual machine 38*e* by using a lifecycle policy provided by the provisioning message. While the authorized credentials for virtual machine 38*e* may only be further restricted during configuration, the lifecycle policy may be either restricted or enhanced. In one embodiment, the frequency at which virtual machine 38*e* checks logic 28 at remote site 24 for updates of the required mobile objects associated with a desired service may be decreased, and authorization to extend the desired service may be provided.

At step 72, the provisioning message provides router 18 with the amount of processing resources that should be allocated for use by virtual machine 38*e*. The amount of processing resources allocated by the provisioning message may override the amount of processing resources allocated during configuration of virtual machine 38*e*. The processing resources may include the computing power available from processor 32 and the storage space available in memory 34.

Once virtual machine 38*e* has been configured, virtual machine 38*e* determines an address for logic 28 at remote site 24 at step 74. Virtual machine 38*e* then obtains a manifest for the desired service from logic 28 at remote site 24 using the logic address at step 76. The manifest may include a list of mobile objects required by virtual machine 38*e* to execute the desired service and a list of processing resource dependencies for the required mobile objects. In one embodiment, virtual machine 38*e* obtains the list of required mobile objects for the desired service and the dependencies on processing resources for those objects. In another embodiment, virtual machine 38*e* only retrieves the list of required mobile objects for the desired service.

At step 78, virtual machine 38*e* uses the manifest to determine if the processing resources allocated during configuration may execute the desired service. If the required mobile objects cannot be executed by virtual machine 38*e* due to insufficient processing resources, router 18 indicates that virtual machine 38e is unavailable to execute the desired service at step 92. Routers 18 notify remote site 24 of the failure at step and return to step 62 to wait for another virtual machine provisioning message.

If the allocated processing resources at router 18 is sufficient to execute the desired service, virtual machine 38e uses the logic address to obtain credentials for the desired service from logic 28 at remote site 24 at step 80. Virtual machine 38e compares the service credentials with the authorized credentials created during configuration to determine if the service provider at remote site 24 is authorized to add the desired service to router 18 at step 82. If the service credentials do not match any of the authorized credentials, router 18 indicates that virtual machine 38e is unavailable to execute the desired service at step 92. Routers 18 notify remote site 24 of the failure at step 94 and return to step 62 to wait for another virtual machine provisioning message.

If the service credentials match one of the authorized credentials, virtual machine 38e obtains the lifecycle policy for the desired service from logic 28 at remote site 24 by using the logic address at step 84. The lifecycle policy includes the correct version of the required mobile objects needed to execute the desired service on virtual machine 38e. At step 86, virtual machine 38e compares the correct version of the required mobile objects with the required mobile objects listed in the manifest associated with the desired service.

If the correct version is newer than the version listed in the manifest, virtual machine 38e retrieves the correct version from logic 28 at remote site 24 and loads the mobile objects into memory 34 at step 88. In one embodiment, memory 34 in router 18 stores the current version of the required objects so that virtual machine 38e does not have to retrieve them from remote site 24 each time the desired service is configured on virtual machine 38e. Virtual machine 38e initializes the desired service using the required mobile objects on router 18 at step 90. If the correct version matches the version listed in the manifest, virtual machine 38e loads the required mobile objects from the manifest into memory 34 to initialize the desired service on router 18 at step 90.

FIG. 6 illustrates a block diagram of mobility bindings created when mobile objects 104 and 106 migrate from a home network to a foreign network. Home object agent 100 may be located on virtual machine 38e at any of routers 18 on networks 12. In operation, home object agent 100 maintains location information for mobile objects 104 and 106 (generally referred to as mobile objects 104) and tunnels packets to mobile objects 104 when they migrate to the foreign network. Mobile objects 104 may be object code or any other form of object-oriented software available from logic 28 at remote site 24. Mobile objects 104 may be executed by virtual machine 38e on any of routers 18 to provide a desired service on networks 12.

Foreign object agent 102 may be located on virtual machine 38e at any of routers 18 on networks 12. In operation, foreign object agent 102 provides an address and a name for mobile objects 104 while mobile objects 104 are located on the foreign network and facilitates communication with home object agent 100. Corresponding object 116 may be located on virtual machine 38e at any of routers 18 on networks 12 and/or remote site 24. In operation, corresponding object 116 communicates with mobile objects 104 to request use of a desired service. In one embodiment, mobile object 104 may extend a desired service provided by mobile object 106 such that mobile object 104 provides the functionality of corresponding object 116.

Each one of networks 12 may include home object agent 100 that maintains location information for each of mobile objects 104 associated with the desired services from logic 28 executing on routers 18 within networks 12 and at least one foreign object agent 102 that provides a care-of-name and care-of-address for each of mobile objects 104 that have migrated from their home networks. Although specific embodiments are described in which only mobile objects 104 migrate to a foreign network, home object agent 100, foreign object agent 102 and corresponding object 116 also may have the ability to dynamically migrate to routers 18 on networks 12.

In the illustrated embodiment, network 16 is the home network for mobile objects 104 and network 12 is the foreign network available to receive migrating mobile objects 104. Router 22a includes virtual machine 38e to execute a first part of a desired service provided by mobile object 104 and router 22c includes virtual machine 38e to execute a second part of the desired service provided by mobile object 106. Home object agent 100 is located on virtual machine 38e at router 22b on network 16 and foreign object agent 102 is located on virtual machine 38e at router 18a on network 12.

When virtual machine 38e initiates the desired service on routers 22a and 22c, mobile objects 104 obtain home addresses through a dynamic name service (DNS) server 23 on network 16, through assignment by a network administrator, or through any other suitable technique for providing the desired service with a unique and identifiable location on network 16. Each of the home addresses may be an Internet Protocol (IP) address, an Ethernet address, a DECNET address, an APPLE TALK address, or any other suitable address that may be assigned to the desired service on network 16. Mobile objects 104 register their respective addresses with home object agent 100 and directly receive all communications intended for the desired service while mobile objects 104 are located at their respective home addresses on network 16.

In operation, mobile objects 104 determine if all or a part of the desired service should be moved to network 12. For example, mobile object 104 may decide to migrate based on the amount of processing resources allocated for virtual machine 38e at router 22a, the lease constraints associated with a request to use the desired service by corresponding object 116 executing on a remote router (e.g., router 20a on network 14), the location of corresponding object 116 on networks 12 with respect to the desired service, the traffic flow on network 16, or any other criteria that may be obtained by mobile object 104 from network 16.

In one embodiment, mobile object 104 migrates to router 18b on network 12. The first part of the desired service associated with mobile object 104 may be configured and initialized on virtual machine 38e at router 18a by using the process described in reference to FIG. 5. Once virtual machine 38e on router 18a begins executing the first part of the desired service, mobile object 104 discovers foreign object agent 102 on network 12. In the illustrated embodiment, foreign object agent 102 is located at router 18a. In an alternative embodiment, both mobile object 104 and foreign object agent 102 are located on two separate virtual machines 38e at router 18b.

If mobile object 104 is authorized to register with foreign object agent 102, foreign object agent 102 assigns a care-of-address and a care-of-name to mobile object 104, which uniquely identifies mobile object 104 while it is located on network 12. Foreign object agent 104 communicates the care-of-address and the care-of-name for mobile object 104 to home object agent 100. If foreign object agent 102 is authorized to communicate with home object agent 100 and home object agent 100 authenticates the identity for mobile object 104, home object agent 100 creates a mobility binding for mobile object 104 on network 12. Home object agent 100 uses the established binding to direct all communications intended for the first part of the desired service associated with mobile object 104 at router 18a on network 12.

In operation, corresponding object 116 located on virtual machine 38e at router 20a on network 14 may request to use the desired service from routers 22a and 22c on network 16 by using the home addresses associated with each part of the desired service. Home object agent 100 at router 22b may detect the request and may determine that the desired service is not located at router 22a on network 16. Home object agent 100 may use the desired service name provided by corresponding object 116 to locate the care-of-name and care-of-address for mobile object 104. Home object agent 100 establishes a tunnel from home object agent 100 to foreign object agent 102 on network 12 by using the care-of-address associated with the desired service as an endpoint for the tunnel. The request to use the desired service may be communicated through the tunnel from home object agent 100 to foreign object agent 102 without the use of standard routing mechanisms. Foreign agent 102 may then forward the request to mobile object 104 at router 18a.

In one embodiment, home object agent 100 creates multiple simultaneous bindings for mobile object 104. For example, mobile object 104 may create duplicate mobile object 108 at router 18a on network 12. Duplicate mobile object 108 is a copy of mobile object 104 and also provides the first part of the desired service. Foreign object agent 102 issues a second care-of-address and a second care-of-name for duplicate mobile object 108 and home object agent 100 creates a duplicate mobility binding for mobile object 108 by using the second care-of-address and the second care-of-name. Home object agent 100 simultaneously communicates packets intended for mobile object 104 to the care-of-address and care-of-name associated with mobile object 104 and the second care-of-address and second care-of-name associated with duplicate mobile object 108.

Mobile object 104 may clone itself a second time to create duplicate mobile object 110. A third binding is established at home object agent 100 using a third care-of-address and a third care-of-name assigned by foreign object agent 102. Home object agent 100 communicates packets to mobile object 104 and duplicate mobile objects 108 and 110. A binding may be removed from home object agent 100 when at least one of mobile object 104 and duplicate mobile objects 108 and 110 removes the desired service from routers 18. For example, a consumer of the first part of the desired service executed by duplicate mobile object 108 may complete using the first part of the desired service or the lifecycle of mobile object 108 may expire. Duplicate mobile object 108 may detect that it is inactive, release the processing resources used to execute the desired service and notify home object agent 100 that the desired service is no longer being executed by duplicate mobile object 108. Home object agent 100 deletes the binding associated with duplicate mobile object 108 and sends packets to mobile object 104 and duplicate mobile object 110 until home object agent 100 receives notification that the desired service has been removed by mobile object 104 and/or duplicate mobile object 110.

In further embodiments, mobile object 104 separates the first and/or second parts of the desired service into sub-parts and distributes the sub-parts within networks 12. For example, mobile object 104 may determine that the first part of the desired service should be divided into secondary mobile objects 112 and 114 (generally referred to as secondary mobile objects 112). Since home object agent 100 only maintains location information for mobile objects 104, home object agent 100 has no knowledge of the division. Thus, mobile object 104 acts as a home object agent for secondary mobile objects 112. If one or both of secondary mobile objects 112 migrate to a foreign network, mobile object 104 creates a binding for secondary mobile objects 112 on the foreign network using a care-of-address and a care-of name. Therefore, any packets intended for secondary mobile objects 112 are received by home object agent 100 and communicated from home object agent 100 to secondary mobile objects 112 via mobile object 104.

FIG. 7 illustrates a data structure for mobile object 104 at routers 18 on networks 12. When mobile object 104 migrates to a foreign network, mobile object 104 obtains care-of-address 120 and care-of-name 122 from foreign object agent 102. Care-of-address 120 may be an IP address associated with foreign object agent 102, a local IP address acquired by mobile object 104 through DHCP, an IP address owned by mobile object 104 when visiting the foreign network, an Ethernet address, a DECNET address, an APPLE TALK address, or any other suitable address that uniquely identifies the location of mobile object 104, and thus, the desired service, on the foreign network.

Care-of-name 122 may be an extensible, orthogonal naming structure for mobile objects 104 and their associated desired services on networks 12. In one embodiment, care-of-name 122 includes one or more sub-names. Each sub-name may include at least one part that is a fixed orthogonal name and zero or more sub-parts to form an ontology that is bounded by the fixed orthogonal name. The object name for mobile object 104 may be the fixed orthogonal name. A service provider at remote site 24 may create the object name for mobile object 104. When mobile object 104 migrates to the foreign network, foreign object agent 102 may create care-of-name 122 that includes the object name for mobile object 104 and an extension name that uniquely identifies mobile object 104 while it is located on the foreign network.

In operation, mobile object 104 locates foreign object agent 102 through an agent advertisement message broadcast by foreign object agent 102, an agent solicitation message broadcast by mobile object 104 or any other suitable service discovery method. Once mobile object 104 locates foreign object agent 102, mobile object 104 receives foreign object agent (FOA) address 124 from foreign object agent 102. Mobile object 104 uses FOA address 124 to send foreign object agent 102 FOA credentials 126. FOA credentials 126 may be assigned to mobile object 104 and may be presented to each foreign object agent 102 in order to determine if mobile object 104 may register with the selected foreign object agent 102.

If foreign object agent 102 does not accept FOA credentials 126 (e.g., mobile object 104 does not have authorization to register with foreign object agent 102), foreign object agent 102 notifies mobile object 104 of the failure and mobile object 104 attempts to located another foreign object agent on the foreign network or moves to another network. If FOA credentials 126 match one of a list of credentials maintained by foreign object agent 102, mobile object 104 may register with foreign object agent 102 on the foreign network and may obtain care-of-address 120 and care-of-name 122.

Once mobile object 104 registers with foreign object agent 102, a trust relationship is created between mobile object 104 and foreign object agent 102. Based on the trust relationship, mobile object 104 negotiates with foreign object agent 102 for care-of-address 120 and care-of-name 122 by sending foreign agent 102 its object name and home address.

Once foreign object agent 102 assigns care-of-address 120 and care-of-name 122 to mobile object 104, mobile object 104 provides home object agent (HOA) address 128 and HOA credentials 130 to foreign object agent 102. Foreign object agent 102 uses HOA address 128 to locate home object agent 100 on the home network for mobile object 104. If foreign object agent 102 is authorized to communicate with home object agent 100, a trust relationship is created between foreign object agent 102 and home object agent 100.

Based on the trust relationship, foreign object agent 102 presents HOA credentials 130 to home object agent 100. HOA credentials 126 may be presented to home object agent 100 for the purpose of authenticating the identity of mobile object 104. If home object agent 100 rejects HOA credentials 130 from mobile object 104 because mobile object 104 does not have a home address on the home network, home object agent 100 notifies foreign object agent 102 of the failure to authenticate mobile object 104. Foreign object agent 102 relays the failure to mobile object 104. If HOA credentials 130 match the credentials for mobile object 104 stored in home object agent 100, home object agent 100 creates a mobility binding for mobile object 104 by using care-of-address 120 and care-of-name 122.

Figure 8:
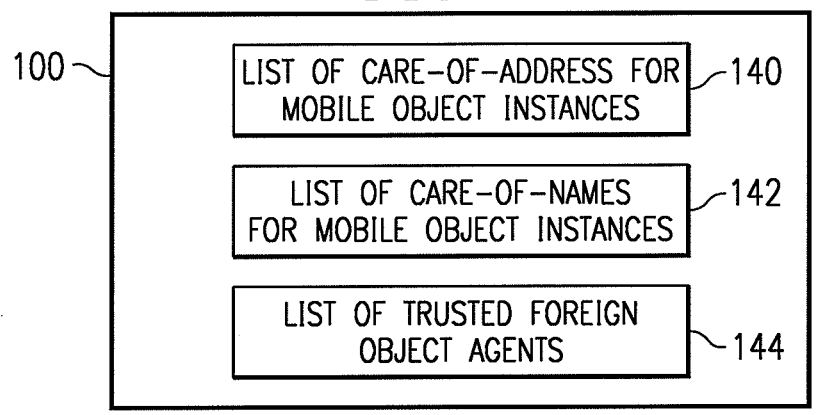
FIG. 8 illustrates a data structure for a home object agent.

FIG. 8 illustrates a data structure for home object agent 100 at routers 18 on networks 12. In operation, home object agent 100 maintains location information for mobile objects 104 that have the same home network as home object agent 100. Home object agent 100 also delivers packets of information to mobile objects 104 when mobile objects 104 are located on a foreign network. In order to deliver the packets, home object agent 100 maintains care-of-address list 140 and care-of-name list 142. Care-of-address list 140 and care-of-name list respectively include care-of-address 120 and care-of-name 122 for each mobile object 104 managed by home object agent 100. Home object agent resolves each care-of-address 120 and care-of-name 122 to create a mobility binding for mobile object 104 when it is located on the foreign network.

In one embodiment, the desired service may be divided into at least two parts executed by two separate mobile objects 104 on different virtual machines 38e. If a first part of the desired service migrates to a foreign network, home object agent 100 may establish a mobility binding for mobile object 104 representing the first part of the desired service. If the second part of desired service migrates from the home network, home object agent 100 creates a separate and unique mobility binding for mobile object 106 representing the second part of the desired service.

After migrating to the foreign network, mobile object 104 may clone itself to create duplicate mobile object 108 that is located on a different virtual machine 38e at routers 18 within the foreign network. Home object agent 100 may create a duplicate mobility binding for duplicate mobile object 108 and may simultaneously send mobile object 104 and duplicate mobile object 108 packets of information. Home object agent 100 may delete the mobility bindings for mobile object 104 and duplicate mobile object 108 when either mobile object 104 or duplicate mobile object 108 removes itself from virtual machine 38e.

Home object agent 100 further maintains trusted FOA credentials list 144, which includes the credentials for each foreign object agent 102 authorized to communicate with home object agent 100. When foreign object agent 102 initially contacts home object agent 100, foreign object agent 102 provides its credentials to home object agent 100. Home object agent 100 compares the credentials with FOA credentials list 144 to determine if foreign object agent 102 is authorized to communicate with home object agent 100. If foreign object agent 102 is not authorized, home object agent 100 notifies foreign object agent 102 that it is not authorized to communicate with home object agent. Foreign object agent 102 notifies mobile object 104 that foreign object agent 102 is not authorized to communicate with home object agent 100 and mobile object 104 attempts to locate another foreign object agent on the foreign network.

If foreign object agent 102 is authorized, a trust relationship is created between mobile object 104 and home object agent 100. Home object agent 100 uses care-of-address 120 and care-of-name 122 sent by foreign object agent 102 to establish a mobility binding for mobile object 104 on the foreign network. Mobile object 104, therefore, uses foreign object agent 102 on the foreign network to receive packets of information intended for mobile object 104.

Figure 9:
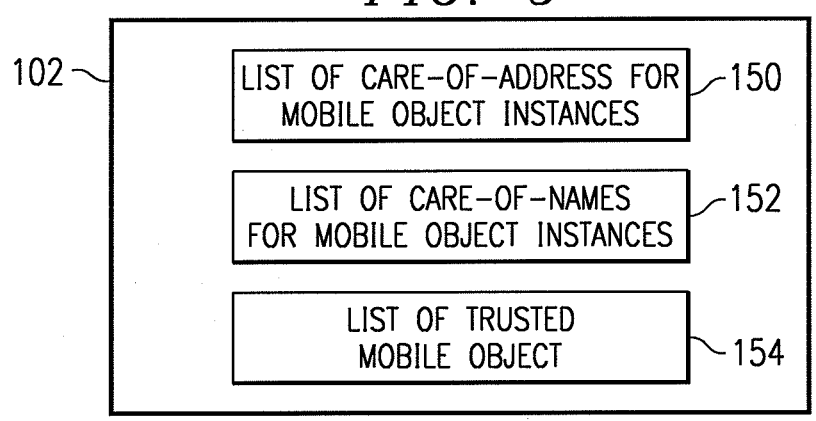
FIG. 9 illustrates a data structure for a foreign object agent.

FIG. 9 illustrates a data structure for foreign object agent 102 at routers 18 on networks 12. In operation, foreign object agent 102 assigns care-of-address 120 and care-of-name 122 to each mobile object 104 that registers with foreign object agent 102. Foreign object agent 102 also maintains local address list 150 and local name list 152. Local address list 150 includes the local network address of virtual machine 38e executing each mobile object 104 and local name list 152 includes the local network name for each mobile object 104 registered with foreign object agent 102. In one embodiment, the local network address may be the address associated with a virtual interface at routers 18. In an alternative embodiment, the local network address may be multiple addresses associated with a virtual service at routers 18.

Foreign object agent 102 further maintains trusted mobile object (MO) credentials list 154, which includes the credentials for each mobile object 104 authorized to register with foreign object agent 102. When mobile object 104 initially contacts foreign object agent 102, mobile object 104 provides FOA credentials 126 to foreign object agent 102. Foreign object agent 102 compares FOA credentials 126 with MO credentials list 154 to determine if mobile object 104 is authorized to register with foreign object agent 102. If mobile object 104 is authorized, mobile object 104 may use foreign object agent 102 on the foreign network to receive packets of information intended for mobile object 104. If mobile object 102 is not authorized, mobile object 104 attempts to locate another foreign object agent on the foreign network.

Figure 10:
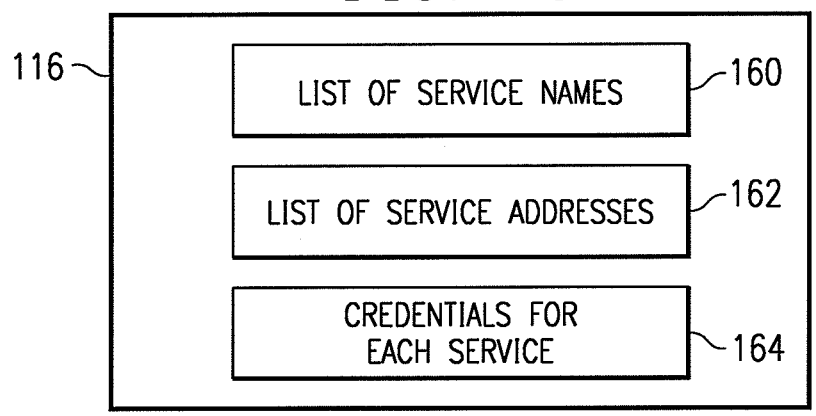
FIG. 10 illustrates a data structure for a corresponding object.

FIG. 10 illustrates a data structure of corresponding object 116 at routers 18 on networks 12. In operation, corresponding object 116 requests to use one or more of the desired services provided by mobile objects 104 on networks 12. In order to request the use of a desired service, corresponding object 116 maintains service name list 160 and service address list 162. Service name list 160 may be created by locating a service broker and obtaining the names of the services available from the service broker. Service address list 162 may be created by associating service addresses provided by the service broker with the appropriate service names. When the service broker provides the addresses for each desired service, it also provides service credentials 164 that may be used by corresponding object 116 to access the desired service.

Figure 11:
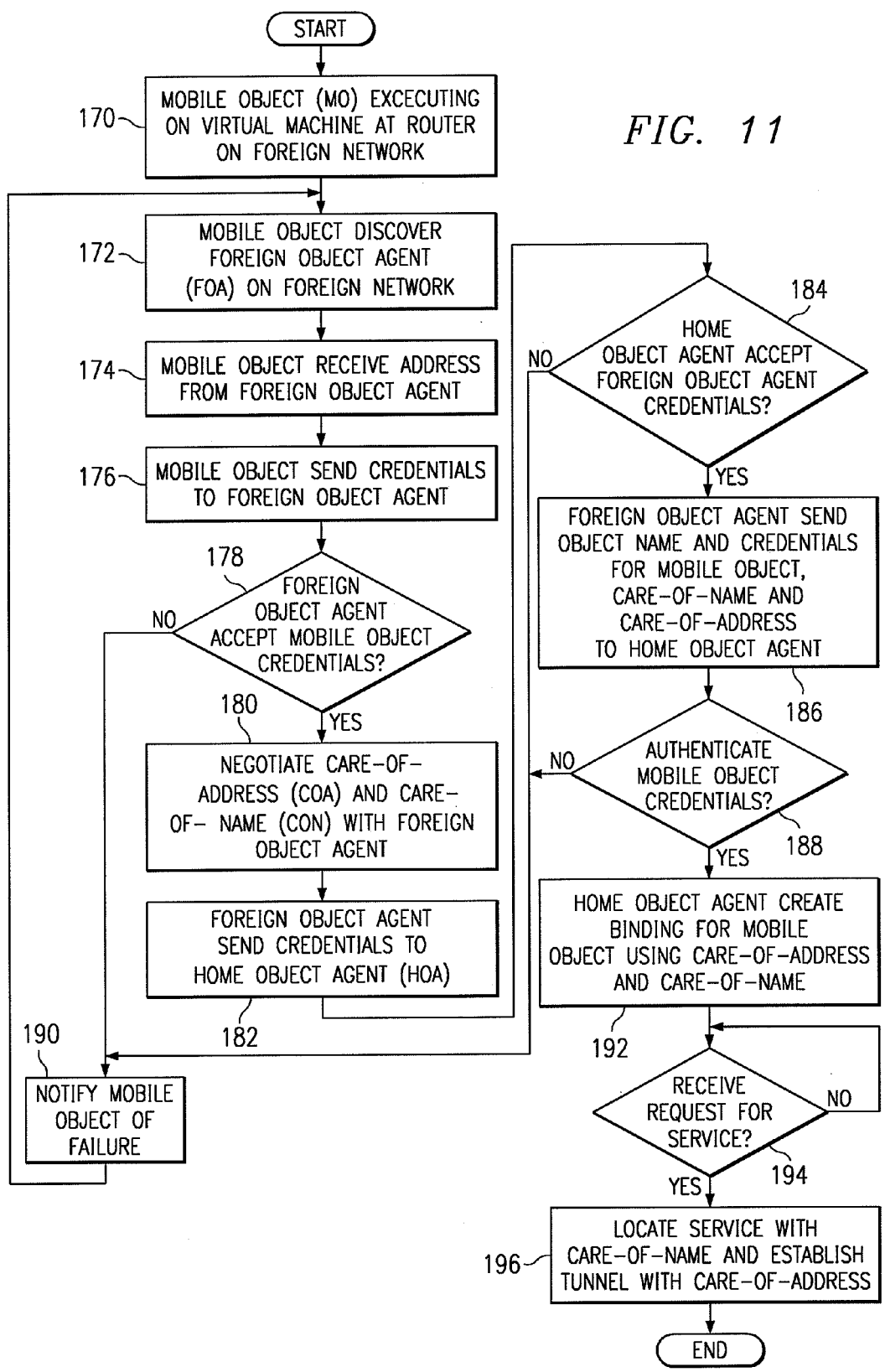
FIG. 11 illustrates a flowchart of a method for registering the mobile object on the foreign network.

FIG. 11 illustrates a flow chart for registering mobile object 104 from logic 28 with a foreign network. Generally, upon receiving FOA address 124, mobile object 104 negotiates with foreign object agent 102 for care-of-address 120 and care-of-name 122 by providing foreign object agent 102 with FOA credentials 126. If FOA credentials 126 match one of the credentials in MO credentials list 154, foreign object agent 102 locates home object agent 100 using HOA address 128 and sends care-of-address 120 and care-of-name 122 to home object agent 100. Home object agent 100 creates a mobility binding for mobile object 104 if credentials provided by foreign object agent 102 match one of the credentials in FOA credentials list 126 and HOA credentials 130 match the credentials for mobile object 104 stored in home object agent 100. Once the mobility binding is established, home object agent 100 communicates packets of information to mobile object 104 via foreign object agent 102.

As shown at step 170, mobile object 104 executes a desired service on virtual machine 38e at routers 18 on networks 12. Mobile object 104 discovers foreign object agent 102 on a foreign network at step 172. In one embodiment, mobile object 104 broadcasts an agent solicitation message after migrating to the foreign network. In another embodiment, foreign object agent 102 broadcasts an agent advertisement message over the foreign network to advertise its services. Mobile object 104 receives the message after migrating to the foreign network and uses the message to determine its current point of attachment to the foreign network.

Once mobile object 104 has discovered foreign object agent 102 on the foreign network, foreign object agent 102 sends FOA address 124 to mobile object 104 at step 174. Mobile object 104 uses FOA address 124 to send FOA credentials 126 to foreign object agent 102 using FOA address 124 in order to obtain authorization to register with foreign object agent 102 at step 176. Foreign object agent 102 compares FOA credentials with MO credentials list 154 at step 178. If FOA credentials 126 do not match one of the authorized credentials in MO credentials list 154, foreign object agent 102 notifies mobile object 104 of the failure at step 190 and mobile object 104 returns to step 172 to discover another foreign object agent on the foreign network.

If FOA credentials 126 match one of the authorized credentials in MO credentials list 154, mobile object 104 negotiates with foreign object agent 102 for care-of-address 120 and care-of-name 122 by sending the name for mobile object 104 and HOA address 128 at step 186. Foreign object agent 102 also uses care-of-address 120 and care-of-name 122 to communicate with mobile object 104 while mobile object 104 is located on the foreign network. At step 182, foreign object agent 102 sends its credentials to home object agent 100 located on a home network. Home object agent 100 compares the credentials with FOA credentials list at step 184. If the credentials from foreign object agent 102 do not match one of the authorized credentials in FOA credentials list 144, home object agent 100 notifies mobile object 104 of the failure via foreign object agent 102 at step 190 and mobile object 104 returns to step 172 to discover another foreign object agent on the foreign network.

If the credentials from foreign object agent 102 match one of the authorized credentials in FOA credentials list 144, foreign object agent 102 uses HOA address 128 to deliver an object name for mobile object 104, HOA credentials 130, care-of-address 120, and care-of-name 122 to home object agent 100 at step 186. Home object agent 100 authenticates the identity of mobile object 104 by using the object name and HOA credentials 130 at step 188. If home object agent 100 determines that mobile object 104 is not a part of the home network, home object agent 100 notifies mobile object 104 of the failure via foreign object agent 102 at step 190 and mobile object 104 returns to step 172 to discover another foreign object agent on the foreign network. If home object agent 100 authenticates the identity of mobile object 104, home object agent 100 creates a mobility binding for mobile object 104 by using care-of-address 120 and care-of-name 122 at step 192. The mobility binding enables home object agent 100 to deliver packets of information to mobile object 104 when mobile object 104 is located on the foreign network.

At step 194, home object agent 100 determines if a request for a desired service provided by mobile object 104 has been received from corresponding object 116. If a request has been received, home object agent 100 uses care-of-name 122 to locate mobile object 104 associated with the desired service and creates a tunnel from HOA address to care-of-address 120 at step 196. Home object agent 100 uses the tunnel to directly communicate packets to mobile object 104 on the foreign network. Mobile object 104 delivers the desired service to corresponding object 116 by using standard routing mechanisms.

Figure 12:
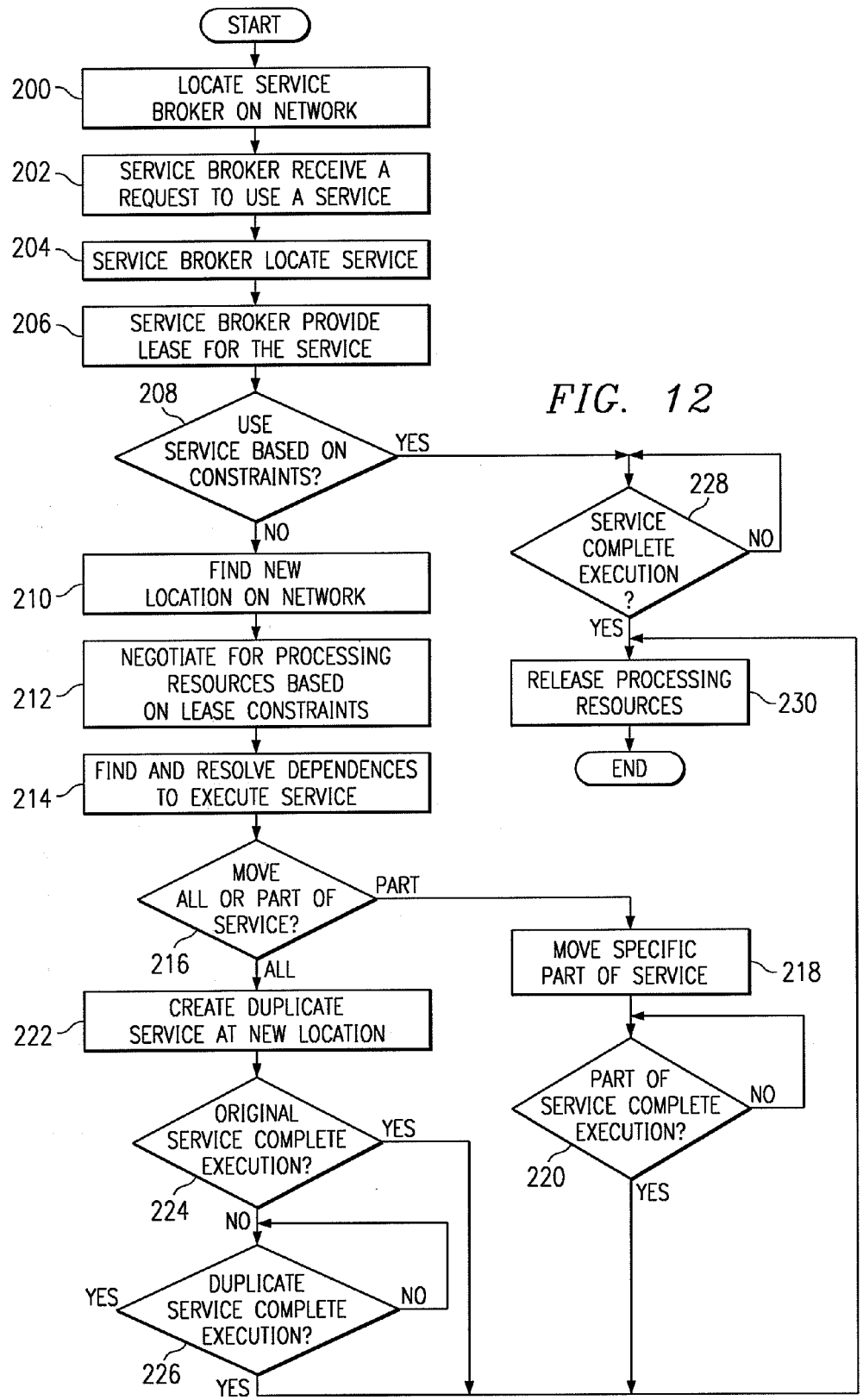
FIG. 12 illustrates a flowchart of a method for providing a distributed service in the network in accordance with the teachings of the present invention.

FIG. 12 illustrates a flow chart for providing a distributed service as provided by mobile object 104 from logic 28 within networks 12. Generally, a service broker (e.g., home object agent 100) receives a request to use a desired service from corresponding object 116 and locates the desired service on networks 12. The service broker creates a lease for corresponding object 116 to use the desired service based on the percentage of the desired service available and the processing resources needed to execute the available percentage. If mobile object 104 providing the desired service cannot execute the desired service on virtual machine 38e at a selected one of routers 18 based on the lease constraints, mobile object 104 discovers virtual machine 38e at another one of routers 18 and negotiates with virtual machine 38e at the new location for processing resources to execute the desired service. Mobile object 104 moves all or a part of the desired service to virtual machine 38e at the new location and provides the service to corresponding object 116.

As shown at step 200, corresponding object 116 locates a service broker on networks 12. Corresponding object 116 locates the service broker through a broker advertisement message broadcast by the service broker, a broker solicitation message broadcast by corresponding object 116 or any other suitable service discovery method. At step 202, the service broker receives a request from corresponding object 116 to use a desired service provided by one of mobile objects 104 located on networks 12. Upon receiving a request for a desired service from corresponding object 116, the service broker determines if the desired service is a combination of at least two services available on networks 12. If the desired service requires the combination of at least two services, the service broker creates a dynamic service path representing the combination of services that provides an optimized path for the desired service. Criteria used to determine the best combination may include the amount of processing resources needed to perform each of the services, the amount of traffic flow on networks 12 or any other parameter used to create an optimal path from the starting point to the goal in the request.

In one example, the request may include translation of text to RTF. The service broker may provide a text to HTML conversion, a text to WORD conversion, a HTML to RTF conversion and a WORD to RTF conversion. Based on these services, the dynamic path may be text to HTML to RTF or text to WORD to RTF depending on the lease constraints associated with the desired service.

The service broker locates the desired service on networks 12 at step 204. In one embodiment, the service broker may be home object agent 100. Home object agent 100 locates the desired service by comparing a service name provided by corresponding object 116 with a list of object names for each of mobile objects 104. If the service name matches one of the object names, home object agent 100 provides the home address for mobile object 104 to corresponding object 116. Corresponding object 116 uses the home address to communicate with mobile object 104 and, thus, to access the desired service.

Once the service broker has located the desired service, the service broker determines how much of the desired service is available for use and how long the service may be found at its present location, and provides lease constraints to corresponding object 116 at step 206. In one embodiment, the lease constraints may be specified in the lifecycle policy of mobile object 104. The lease constraints may include a percentage of the desired service available for use by corresponding object 116, an amount of processing resources required to execute the corresponding percentage of the desired service, or any other suitable constraint that determines how the capacity of each service may be shared by at least two corresponding objects 116. At step 208, the service broker determines if the desired service provided by mobile object 104 at router 18 may be used by corresponding object 116 based on the lease constraints.

If the desired service may be used, mobile object 104 associated with the desired service determines if corresponding object 116 has completed using the desired service at step 228. If corresponding object 116 has finished using the desired service, mobile object 104 releases the processing resources allocated to execute the desired service on the virtual machine for corresponding object 116 at step 230.

If the desired service may not be used by corresponding object 116, mobile object 104 discovers a new location for the desired service on networks 12 at step 210. Once mobile object 104 locates an available virtual machine at one of routers 18, mobile object 104 negotiates for processing resources to execute the desired service on the available virtual machine based on the lease constraints at step 212. Mobile object 104 further finds and resolves all dependencies for the processing resources to execute the desired service at step 214.

At step 216, mobile object 104 determines whether to move all or a part of the desired service to the new location. If mobile object moves a part of the desired service, mobile object 104 creates secondary mobile object 112 on virtual machine 38e at the new location at step 218. Secondary mobile object 112 determines if corresponding object 116 has completed using the desired service at step 220. If corresponding object 116 has finished using the desired service, secondary mobile object 112 releases the processing resources allocated to execute the desired service on virtual machine 38e for corresponding object 116 at step 230.

If mobile object 104 determines to move all of the desired service, mobile object 104 creates duplicate mobile object 108 on virtual machine 38e at the new location at step 222. Mobile object 104 determines if corresponding object 116 has completed using the desired service at the original location at step 224. If corresponding object 116 has finished using the desired service at the original location, mobile object 104 releases the processing resources allocated to execute the desired service on virtual machine 38e for corresponding object 116 at step 230.

If corresponding object 116 has not finished using the desired service at the original location, duplicate mobile object 108 determines if corresponding object 116 has completed using the desired service at the new location at step 226. If corresponding object 116 has finished using the desired service at the new location, duplicate mobile object 108 releases the processing resources allocated to execute the desired service on virtual machine 38e for corresponding object 116 at step 230.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for registering a mobile object with a foreign network, comprising:
    moving a mobile object to a foreign network in response to unavailable resources at a home network, the mobile object being computer language code configured to be stored in non-transitory memory, executable by the home or foreign networks, and associated with a desired service;
    executing the mobile object on a first virtual machine at a first router on the foreign network;
    generating a care-of-name that identifies the mobile object in the foreign network, the care-of-name generated at a foreign object agent located on the foreign network, wherein the care-of-name comprises an object name having at least a portion controlled by a service provider at a remote site and associated with the mobile object and an extension name to uniquely identify the mobile object on the foreign network;
    communicating the care-of-name to a home object agent located on the home network;
    generating a mobility binding for the mobile object at the home object agent, the mobility binding including the care-of-name;
    receiving a request to use the desired service, the request comprising a lease constraint;
    determining whether the first virtual machine can execute the service based on the lease constraint; and
    distributing part of the desired service to a second router in response to the first virtual machine not being able to execute the service based on the lease constraint, wherein distributing part of the desired service to the second router comprises establishing a second virtual machine at the second router.

2. The method of claim 1, further comprising generating a care-of-address that uniquely identifies the network location of the mobile object, the care-of-name bound with the care-of-address.

3. The method of claim 1, further comprising providing an object name associated with the mobile object to the foreign object agent to create the care-of-name.

4. The method of claim 1, further comprising the home object agent configured to maintain network location information for the mobile object.

5. The method of claim 1, further comprising:
    discovering the foreign object agent on the foreign network; and
    receiving an address associated with the foreign object agent at the mobile object.

6. The method of claim 1, further comprising locating the mobile object on the foreign network by using the care-of-name associated with the mobility binding.

7. The method of claim 1, further comprising determining if the mobile object is authorized to negotiate with the foreign object agent based on object credentials associated with the mobile object.

8. The method of claim 1, further comprising:
    determining if the mobile object is authorized to negotiate with the foreign object agent based on object credentials associated with the mobile object; and
    providing authorization for the foreign object agent to communicate with the home object agent based on agent credentials associated with the foreign object agent if the mobile object is authorized to negotiate with the foreign object agent.

9. The method of claim 1, further comprising:
determining if the mobile object is authorized to negotiate with the foreign object agent based on object credentials associated with the mobile object;
providing authorization for the foreign object agent to communicate with the home object agent based on agent credentials associated with the foreign object agent if the mobile object is authorized to negotiate with the foreign object agent; and
authenticating the object credentials at the home object agent to create the mobility binding for the mobile object if the foreign object agent receives authorization to communicate with the home object agent.

10. The method of claim 1, further comprising:
copying the mobile object to create a duplicate mobile object on a third virtual machine at a third router located on the foreign network; and
creating a duplicate mobility binding at the home agent for the duplicate mobile object by obtaining a duplicate care-of-name from the foreign object agent.

11. The method of claim 1, further comprising:
moving a portion of the mobile object to a third virtual machine at a third router located on the foreign network; and
creating a secondary mobility binding at the first router for the portion of the mobile object by obtaining a secondary care-of-name from the foreign object agent.

12. A method for registering a mobile object with a foreign network, comprising:
moving a mobile object to a foreign network in response to unavailable resources at a home network, the mobile object being computer language code configured to be stored in non-transitory memory, executable by the home or foreign networks, and associated with a desired service;
executing the mobile object on a virtual machine at a router on the foreign network;
generating a care-of-name that identifies the mobile object in the foreign network, the care-of-name generated at a foreign object agent located on the foreign network, wherein the care-of-name comprises an object name having at least a portion controlled by a service provider at a remote site and associated with the mobile object and an extension name to uniquely identify the mobile object on the foreign network;
communicating the care-of-name to a home object agent located on the home network;
generating a mobility binding for the mobile object at the home object agent, the mobility binding including the care-of-name;
locating the mobile object on the foreign network by using the care-of-name associated with the mobility binding;
determining a care-of-address for the mobile object based on the care-of-name;
receiving a request to use the desired service, the request comprising a lease constraint;
determining whether the first virtual machine can execute the desired service based on the lease constraint; and
distributing part of the desired service to a second router in response to the first virtual machine not being able to execute the service based on the lease constraint, wherein distributing part of the desired service to the second router comprises establishing a second virtual machine at the second router.

13. The method of claim 12, further comprising:
generating the care-of-address associated with the care-of-name for the mobile object at the foreign object agent; and
establishing a tunnel between the home object agent and the mobile object by using the care-of-address as an endpoint of the tunnel.

14. The method of claim 13, wherein the care-of-address comprises an Internet Protocol address.

15. The method of claim 12, further comprising the home object agent configured to maintain network location information for the mobile object.

16. A router comprising:
a memory;
a virtual machine configured to host a mobile object;
the router configured to:
receive the mobile object at a foreign network in response to unavailable resources at a home network;
execute the mobile object on a virtual machine on the foreign network
negotiate for the mobile object with a foreign object agent located on the foreign network for a care-of-name that identifies the mobile object in the foreign network, the care-of-name comprises object name having at least a portion controlled by a service provider at a remote site and associated with the mobile object and an extension name that uniquely identifies the mobile object on the foreign network; and
obtain a mobility binding for the mobile object from a home object agent located on the home network by using the care-of-name communicated to the home object agent located on the home network, the mobility binding is generated by the home object agent and includes the care-of-name;
wherein the mobile object is computer language code configured to be stored in non-transitory memory, executable by the home or foreign networks, and associated with a desired service;
receive a request to use the desired service, the request comprising a lease constraint;
determine whether the virtual machine can execute the desired service based on the lease constraint; and
distribute part of the desired service to a second router in response to the virtual machine not being able to execute the service based on the lease constraint, wherein distributing part of the desired service to the second router comprises establishing a second virtual machine at the second router.

17. The router of claim 16, where the mobile object is further configured to generate a care-of-address that uniquely identifies the network location of the mobile object, the care-of-name bound with the care-of-address.

18. The router of claim 16, where the mobile object is further configured to generate a care-of-address that uniquely identifies the network location of the mobile object, the care-of-name bound with the care-of-address.

19. The router of claim 16, further comprising the mobile object configured to provide an object name associated with the mobile object to the foreign object agent.

20. The router of claim 16, further comprising the home object agent configured to:
host the mobile object on the home network; and
maintain network location information for the mobile object.

21. The router of claim 16, wherein the mobile object is configured to:

discover the foreign object agent on the foreign network through an agent solicitation message; and receive an address associated with the foreign object agent.

22. The router of claim 16, further comprising an agent virtual machine configured to host the foreign object agent.

23. The router of claim 16, wherein the mobile object is configured to:
create a duplicate mobile object configured to be hosted on a duplicate virtual machine at a duplicate router on the foreign network; and
obtain a duplicate mobility binding from the home object agent by receiving a duplicate care-of-name from the foreign object agent.

24. The router of claim 16, wherein the mobile object is configured to:
move a portion of the mobile object to a duplicate virtual machine at a duplicate router on the foreign network; and
obtain a secondary mobility binding at the router for the portion of the mobile object by obtaining a secondary care-of-name from the foreign object agent.

25. The router of claim 16, further wherein the mobile object is configured to send object credentials to the foreign object agent to obtain authorization to negotiate with the foreign object agent; and
wherein the mobile object obtains the mobility binding if the home object agent provides authorization for the foreign object agent to communicate with the home object agent and authenticates object credentials associated with the mobile object.

26. Logic encoded in non-transitory memory for registering a mobile object with a foreign network, the logic, when executed by a processor, configured to perform the following steps:
move a mobile object to a foreign network in response to unavailable resources at a home network, the mobile object being computer language code configured to be executed by or executed on the home or foreign networks and associated with a desired service;
executing the mobile object on a first virtual machine at a first router on the foreign network;
generating a care-of-name that identifies the mobile object in the foreign network, the care-of-name generated at a foreign object agent located on the foreign network, wherein the care-of-name comprises an object name having at least a portion controlled by a service provider at a remote site and associated with the mobile object and an extension name to uniquely identify the mobile object on the foreign network;
sending the care-of-name to a home object agent located on the home network;
generating a mobility binding for the mobile object at the home object agent, the mobility binding including the care-of-name;
receiving a request to use the desired service, the request comprising a lease constraint;
determining whether the first virtual machine can execute the desired service based on the lease constraint; and
distributing part of the desired service to a second router in response to the first virtual machine not being able to execute the service based on the lease constraint, wherein distributing part of the desired service to the second router comprises establishing a second virtual machine at the second router.

27. The logic of claim 26, further configured to generate a care-of-address that uniquely identifies the network location of the mobile object, the care-of-name bound with the care-of-address.

28. The logic of claim 26, further configured to generate a care-of-address that uniquely identifies the network location of the mobile object, the care-of-name bound with the care-of-address.

29. The logic of claim 26, further comprising providing an object name associated with the mobile object to the foreign object agent to create the care-of-name.

30. The logic of claim 26, further comprising the home object agent configured to maintain network location information for the mobile object.

31. The logic of claim 26, further comprising:
discovering the foreign object agent on the foreign network; and
receiving an address associated with the foreign object agent at the mobile object.

32. The logic of claim 26, further comprising determining if the mobile object is authorized to negotiate with the foreign object agent based on object credentials associated with the mobile object.

33. The logic of claim 26, further comprising:
determining if the mobile object is authorized to negotiate with the foreign object agent based on object credentials associated with the mobile object; and
providing authorization for the foreign object agent to communicate with the home object agent based on agent credentials associated with the foreign object agent if the mobile object is authorized to negotiate with the foreign object agent.

34. The logic of claim 26, further comprising:
determining if the mobile object is authorized to negotiate with the foreign object agent based on object credentials associated with the mobile object;
providing authorization for the foreign object agent to communicate with the home object agent based on agent credentials associated with the foreign object agent if the mobile object is authorized to negotiate with the foreign object agent; and
authenticating the object credentials at the home object agent to create the mobility binding for the mobile object if the foreign object agent receives authorization to communicate with the home object agent.

35. The logic of claim 26, further comprising:
copying the mobile object to create a duplicate mobile object on a third virtual machine at a third router located on the foreign network; and
creating a duplicate mobility binding at the home agent for the duplicate mobile object by obtaining a duplicate care-of-name from the foreign object agent.

36. The logic of claim 26, further comprising:
moving a portion of the mobile object to a third virtual machine at a third router located on the foreign network; and
creating a secondary mobility binding at the first router for the portion of the mobile object by obtaining a secondary care-of-name from the foreign object agent.

37. An apparatus for registering a mobile object with a foreign network, comprising:
means for storing the mobile object in non-transitory memory;
means for moving the mobile object to a foreign network in response to unavailable resources at a home network, the mobile object being computer language code executable by the home or foreign networks and associated with a desired service;

means for executing the mobile object on a virtual machine at a router on the foreign network;

means for generating a care-of-name that identifies the mobile object in the foreign network, the care-of-name generated at a foreign object agent located on the foreign network, wherein the care-of-name comprises an object name having at least a portion controlled by a service provider at a remote site and associated with the mobile object and an extension name to uniquely identify the mobile object on the foreign network;

means for communicating the care-of-name to a home object agent located on the home network;

means for generating a mobility binding at the home object agent for the mobile object, the mobility binding including the care-of-name;

means for receiving a request to use the desired service, the request comprising a lease constraint;

means for determining whether the virtual machine can execute the desired service based on the lease constraint; and means for distributing part of the desired service to a second router in response to the virtual machine not being able to execute the service based on the lease constraint, wherein distributing part of the desired service to the second router comprises establishing a second virtual machine at the second router.

38. The apparatus of claim 37, further comprising means for locating the mobile object on the foreign network by using the care-of-name associated with the mobility binding.

39. The apparatus of claim 37, further comprising means for generating a care-of-address that uniquely identifies the network location of the mobile object, the care-of-name bound with the care-of-address.

* * * * *